United States Patent
Zhai et al.

(10) Patent No.: US 12,195,340 B2
(45) Date of Patent: Jan. 14, 2025

(54) UNIFORM DISPERSING OF GRAPHENE NANOPARTICLES IN A HOST

(71) Applicant: University of Central Florida Research Foundation, Inc., Orlando, FL (US)

(72) Inventors: Lei Zhai, Oviedo, FL (US); Matthew McInnis, Orlando, FL (US)

(73) Assignee: University of Central Florida Research Foundation, Inc., Orlando, FL (US)

( * ) Notice: Subject to any disclaimer, the term of this patent is extended or adjusted under 35 U.S.C. 154(b) by 242 days.

(21) Appl. No.: 15/554,974

(22) PCT Filed: Mar. 12, 2016

(86) PCT No.: PCT/US2016/022229
§ 371 (c)(1),
(2) Date: Aug. 31, 2017

(87) PCT Pub. No.: WO2016/149150
PCT Pub. Date: Sep. 22, 2016

(65) Prior Publication Data
US 2018/0030277 A1 Feb. 1, 2018

Related U.S. Application Data

(60) Provisional application No. 62/132,699, filed on Mar. 13, 2015.

(51) Int. Cl.
*C01B 32/198* (2017.01)
*B22F 1/12* (2022.01)
(Continued)

(52) U.S. Cl.
CPC .............. *C01B 32/198* (2017.08); *B22F 1/12* (2022.01); *B22F 3/02* (2013.01); *B22F 3/14* (2013.01);
(Continued)

(58) Field of Classification Search
CPC ... C09C 1/44; C08K 3/042; B22F 9/04; B22F 2009/041; B29B 9/02; C04B 35/5251;
(Continued)

(56) References Cited

U.S. PATENT DOCUMENTS

| | | |
|---|---|---|
| 2,459,520 A | 1/1949 | Greenshields |
| 4,046,863 A | 9/1977 | Kobayashi et al. |

(Continued)

FOREIGN PATENT DOCUMENTS

| | | |
|---|---|---|
| CN | 101462889 A | 6/2009 |
| CN | 102021633 A | 4/2011 |

(Continued)

OTHER PUBLICATIONS

Ebinezar, et al., "Analysis of hardness test for aluminum carbon nanotube metal matrix and graphene," Indian journal of Engineering, vol. 10, No. 21, 2014, pp. 33-39. (Year: 2014).*
(Continued)

*Primary Examiner* — Paul A Wartalowicz
*Assistant Examiner* — Catherine P Smith
(74) *Attorney, Agent, or Firm* — Edwin S. Flores; Daniel J. Chalker; Chalker Flores, LLP

(57) ABSTRACT

The present invention includes a simple, scalable and solventless method of dispersing graphene into polymers, thereby providing a method of large-scale production of graphene-polymer composites. The composite powder can then be processed using the existing techniques such as extrusion, injection molding, and hot-pressing to produce a composites of useful shapes and sizes while keeping the
(Continued)

advantages imparted by graphene. Composites produced require less graphene filler and are more efficient than currently used methods and is not sensitive to the host used, such composites can have broad applications depending on the host's properties.

6 Claims, 1 Drawing Sheet

(51) Int. Cl.
| | |
|---|---|
| *B22F 3/02* | (2006.01) |
| *B22F 3/14* | (2006.01) |
| *B22F 3/20* | (2006.01) |
| *B22F 3/22* | (2006.01) |
| *B22F 9/04* | (2006.01) |
| *B28B 1/24* | (2006.01) |
| *B28B 3/20* | (2006.01) |
| *B29B 9/02* | (2006.01) |
| *B29B 11/12* | (2006.01) |
| *B29C 43/00* | (2006.01) |
| *B29C 45/00* | (2006.01) |
| *B29C 48/00* | (2019.01) |
| *C01B 32/194* | (2017.01) |
| *C01B 32/21* | (2017.01) |
| *C04B 28/04* | (2006.01) |
| *C04B 35/117* | (2006.01) |
| *C04B 35/14* | (2006.01) |
| *C04B 35/488* | (2006.01) |
| *C04B 35/626* | (2006.01) |
| *C08J 3/20* | (2006.01) |
| *C08K 3/04* | (2006.01) |
| *C09C 1/44* | (2006.01) |
| *C09K 5/14* | (2006.01) |
| *C22C 26/00* | (2006.01) |
| *H01B 1/04* | (2006.01) |
| *B29K 507/04* | (2006.01) |
| *B82Y 30/00* | (2011.01) |
| *B82Y 40/00* | (2011.01) |
| *C04B 111/00* | (2006.01) |
| *C04B 111/94* | (2006.01) |

(52) U.S. Cl.
CPC ............... *B22F 3/20* (2013.01); *B22F 3/225* (2013.01); *B22F 9/04* (2013.01); *B28B 1/24* (2013.01); *B28B 3/20* (2013.01); *B29B 9/02* (2013.01); *B29B 11/12* (2013.01); *B29C 43/003* (2013.01); *B29C 45/0001* (2013.01); *B29C 48/022* (2019.02); *C01B 32/194* (2017.08); *C01B 32/21* (2017.08); *C04B 28/04* (2013.01); *C04B 35/117* (2013.01); *C04B 35/14* (2013.01); *C04B 35/488* (2013.01); *C04B 35/6261* (2013.01); *C08J 3/203* (2013.01); *C08K 3/04* (2013.01); *C08K 3/042* (2017.05); *C09C 1/44* (2013.01); *C09K 5/14* (2013.01); *C22C 26/00* (2013.01); *H01B 1/04* (2013.01); *B22F 2302/40* (2013.01); *B22F 2998/10* (2013.01); *B29K 2507/04* (2013.01); *B82Y 30/00* (2013.01); *B82Y 40/00* (2013.01); *C01B 2204/22* (2013.01); *C01B 2204/24* (2013.01); *C04B 2111/00129* (2013.01); *C04B 2111/00465* (2013.01); *C04B 2111/94* (2013.01); *C04B 2235/425* (2013.01); *C04B 2235/6021* (2013.01); *C04B 2235/604* (2013.01); *Y10S 977/734* (2013.01); *Y10S 977/90* (2013.01)

(58) Field of Classification Search
CPC ..... C04B 2111/00129; C04B 2235/604; C01B 32/19
See application file for complete search history.

(56) References Cited

U.S. PATENT DOCUMENTS

| | | |
|---|---|---|
| 5,057,370 A | 10/1991 | Krieg et al. |
| 5,360,582 A | 11/1994 | Boyd et al. |
| 5,501,934 A | 3/1996 | Sukata et al. |
| 5,506,061 A | 4/1996 | Kindl et al. |
| 5,509,993 A | 4/1996 | Hirschvogel |
| 5,583,176 A | 12/1996 | Häberle |
| 5,883,176 A | 3/1999 | Gerroir et al. |
| 6,004,712 A | 12/1999 | Barbetta et al. |
| 6,172,163 B1 | 1/2001 | Rein et al. |
| 6,348,279 B1 | 2/2002 | Saito et al. |
| 6,436,567 B1 | 8/2002 | Saito et al. |
| 7,005,205 B1 | 2/2006 | Gyoten et al. |
| 7,231,084 B2 | 6/2007 | Tang et al. |
| 7,329,698 B2 | 2/2008 | Noguchi et al. |
| 7,623,340 B1 | 11/2009 | Song et al. |
| 8,168,964 B2 | 5/2012 | Hiura et al. |
| 8,216,541 B2 | 7/2012 | Jang et al. |
| 8,580,132 B2 | 11/2013 | Lin et al. |
| 9,802,206 B2 | 10/2017 | Kitaura et al. |
| 10,138,969 B2 * | 11/2018 | Hattori ................. F16D 69/026 |
| 10,287,167 B2 | 5/2019 | Blair |
| 2002/0008031 A1 | 1/2002 | Barsukov et al. |
| 2002/0119358 A1 | 8/2002 | Rock |
| 2002/0182387 A1 | 12/2002 | Mercuri et al. |
| 2004/0000735 A1 | 1/2004 | Gilbert, Sr. et al. |
| 2004/0033189 A1 | 2/2004 | Kaschak et al. |
| 2004/0071896 A1 | 4/2004 | Kang |
| 2004/0209150 A1 | 10/2004 | Rock et al. |
| 2005/0041373 A1 * | 2/2005 | Pruss .................... H01L 23/295 |
| | | 361/508 |
| 2005/0191471 A1 | 9/2005 | Haggquist |
| 2005/0196636 A1 | 9/2005 | Kawakami et al. |
| 2005/0208319 A1 | 9/2005 | Finley et al. |
| 2007/0219336 A1 | 9/2007 | Ito |
| 2007/0284557 A1 | 12/2007 | Gruner et al. |
| 2008/0048152 A1 | 2/2008 | Jang et al. |
| 2008/0206124 A1 | 8/2008 | Jang et al. |
| 2008/0277628 A1 * | 11/2008 | Zhamu ..................... H01B 1/24 |
| | | 252/502 |
| 2008/0279710 A1 | 11/2008 | Zhamu et al. |
| 2008/0318110 A1 | 12/2008 | Budinski et al. |
| 2009/0017211 A1 | 1/2009 | Cruner et al. |
| 2009/0092747 A1 | 4/2009 | Zhamu et al. |
| 2009/0140801 A1 | 6/2009 | Ozyilmaz et al. |
| 2009/0215953 A1 | 8/2009 | Hwang et al. |
| 2009/0224420 A1 | 9/2009 | Wilkinson |
| 2009/0241496 A1 | 10/2009 | Pintault et al. |
| 2010/0006445 A1 | 1/2010 | Tomantschger |
| 2010/0028681 A1 | 2/2010 | Dai et al. |
| 2010/0055025 A1 | 3/2010 | Jang et al. |
| 2010/0055458 A1 | 3/2010 | Jang et al. |
| 2010/0056819 A1 | 3/2010 | Jang et al. |
| 2010/0092809 A1 | 4/2010 | Drzal et al. |
| 2010/0143732 A1 | 6/2010 | Swift et al. |
| 2010/0147188 A1 | 6/2010 | Mamak et al. |
| 2010/0151318 A1 | 6/2010 | Lopatin et al. |
| 2010/0209731 A1 | 8/2010 | Humano |
| 2010/0239870 A1 | 9/2010 | Bowen |
| 2010/0296253 A1 | 11/2010 | Miyamoto et al. |
| 2010/0317790 A1 * | 12/2010 | Jang ........................ D01F 1/10 |
| | | 524/496 |
| 2011/0017585 A1 | 1/2011 | Zhamu et al. |
| 2011/0041980 A1 | 2/2011 | Kim et al. |
| 2011/0049437 A1 | 3/2011 | Crain et al. |
| 2011/0088931 A1 | 4/2011 | Lettow et al. |
| 2011/0120347 A1 * | 5/2011 | Chung .................... C04B 7/527 |
| | | 106/600 |
| 2011/0143018 A1 | 6/2011 | Peng et al. |
| 2011/0143107 A1 | 6/2011 | Steinig-Nowakowski |

(56) References Cited

U.S. PATENT DOCUMENTS

| | | |
|---|---|---|
| 2011/0159372 A1 | 6/2011 | Zhamu et al. |
| 2011/0223405 A1 | 9/2011 | Compton et al. |
| 2011/0256376 A1 | 10/2011 | Compton et al. |
| 2011/0267673 A1 | 11/2011 | Agrawal et al. |
| 2011/0274610 A1 | 11/2011 | Paquette et al. |
| 2011/0281034 A1 | 11/2011 | Lee et al. |
| 2012/0025131 A1 | 2/2012 | Forero |
| 2012/0025420 A1 | 2/2012 | Utashiro et al. |
| 2012/0055612 A1 | 3/2012 | Ahmed et al. |
| 2012/0065309 A1 | 3/2012 | Agrawal et al. |
| 2012/0077017 A1 | 3/2012 | Buresch |
| 2012/0107562 A1 | 3/2012 | Bolotin et al. |
| 2012/0129736 A1 | 5/2012 | Tour et al. |
| 2012/0184065 A1 | 7/2012 | Gharib et al. |
| 2012/0220198 A1 | 8/2012 | Peukert et al. |
| 2012/0228555 A1 | 9/2012 | Cheng et al. |
| 2012/0282419 A1 | 11/2012 | Ahn et al. |
| 2012/0298396 A1 | 11/2012 | Hong et al. |
| 2012/0298620 A1 | 11/2012 | Jiang et al. |
| 2013/0015409 A1 | 1/2013 | Fugetsu |
| 2013/0018204 A1 | 1/2013 | Jeon et al. |
| 2013/0114367 A1 | 5/2013 | Heusinger et al. |
| 2013/0156678 A1 | 6/2013 | Banerjee et al. |
| 2013/0196123 A1* | 8/2013 | Sarver .................... B41M 5/267 427/555 |
| 2013/0217222 A1 | 8/2013 | Johnson et al. |
| 2013/0236715 A1 | 9/2013 | Zhamu et al. |
| 2013/0240033 A1 | 9/2013 | Jeon et al. |
| 2013/0264041 A1* | 10/2013 | Zhamu .................. H01L 23/373 165/185 |
| 2013/0272950 A1 | 10/2013 | Yun et al. |
| 2013/0330833 A1 | 12/2013 | Ruiz et al. |
| 2014/0000751 A1 | 1/2014 | Kagumba et al. |
| 2014/0018480 A1 | 1/2014 | Lee et al. |
| 2014/0030590 A1* | 1/2014 | Wang ....................... H01B 1/04 429/211 |
| 2014/0117745 A1 | 5/2014 | Wilke et al. |
| 2014/0134092 A1 | 5/2014 | Shankman |
| 2014/0143018 A1 | 5/2014 | Nies et al. |
| 2014/0204384 A1 | 7/2014 | Lee et al. |
| 2014/0227211 A1 | 8/2014 | Shankman |
| 2014/0272199 A1 | 9/2014 | Lin et al. |
| 2014/0299475 A1 | 10/2014 | Bullington et al. |
| 2015/0266739 A1 | 9/2015 | Zhamu et al. |
| 2015/0284253 A1 | 10/2015 | Zhamu et al. |
| 2015/0367436 A1 | 12/2015 | Chiu et al. |
| 2016/0002045 A1 | 1/2016 | Blair |
| 2016/0016803 A1 | 1/2016 | Stoltz et al. |
| 2016/0083552 A1* | 3/2016 | Nosker .................... C08L 55/02 525/461 |
| 2016/0144339 A1 | 5/2016 | Kim et al. |
| 2016/0216629 A1 | 7/2016 | Grinwald |
| 2017/0096600 A1* | 4/2017 | Tour ........................ C08K 3/04 |
| 2017/0166722 A1 | 6/2017 | Zhamu et al. |
| 2017/0233290 A1 | 8/2017 | Christiansen et al. |
| 2019/0051903 A1 | 2/2019 | Manabe et al. |

FOREIGN PATENT DOCUMENTS

| | | |
|---|---|---|
| CN | 102586952 A | 7/2012 |
| CN | 102719719 A | 7/2012 |
| CN | 103058541 A | 4/2013 |
| CN | 103130436 A | 6/2013 |
| CN | 103215693 A | 7/2013 |
| CN | 103408880 A | 11/2013 |
| CN | 103545536 A | 1/2014 |
| CN | 10356997 A | 2/2014 |
| CN | 103757823 A | 4/2014 |
| CN | 103819915 A | 5/2014 |
| CN | 103962102 A | 8/2014 |
| CN | 104231270 A | 12/2014 |
| CN | 104319372 A | 1/2015 |
| CN | 104446176 A | 3/2015 |
| CN | 104844930 A | 4/2015 |
| CN | 104910333 A | 9/2015 |
| CN | 106700356 A | 5/2017 |
| CN | 108276576 A | 7/2018 |
| EP | 0949704 A1 | 10/1999 |
| EP | 1227531 A1 | 7/2002 |
| EP | 2560228 A1 | 2/2013 |
| EP | 2771395 A1 | 9/2014 |
| EP | 2964573 A1 | 1/2016 |
| EP | 2964574 A4 | 5/2016 |
| GB | 723598 A | 2/1955 |
| JP | S6169853 A | 4/1986 |
| JP | 64-009808 A | 1/1989 |
| JP | 2012007224 A | 1/2012 |
| JP | 2012136567 A | 7/2012 |
| JP | 2016508953 A | 3/2016 |
| KR | 20110119429 A | 11/2011 |
| KR | 20130048741 A | 4/2013 |
| KR | 10-2013-0090979 A | 8/2013 |
| KR | 1020150026092 | 3/2015 |
| KR | 101625311 B1 | 5/2016 |
| KR | 1020170019802 | 2/2017 |
| RU | 2456361 C1 | 7/2012 |
| WO | 2009032069 | 3/2009 |
| WO | 2009059193 A1 | 5/2009 |
| WO | 2010089326 A1 | 8/2010 |
| WO | 2010091352 A2 | 8/2010 |
| WO | 2011014242 A1 | 2/2011 |
| WO | 2011074125 | 6/2011 |
| WO | 2011074125 A1 | 6/2011 |
| WO | 2011078639 A2 | 6/2011 |
| WO | 2011086391 A1 | 7/2011 |
| WO | 2011087301 | 7/2011 |
| WO | 2011087301 A1 | 7/2011 |
| WO | 2011099761 A1 | 8/2011 |
| WO | 2011162727 A1 | 12/2011 |
| WO | 2012058553 A2 | 5/2012 |
| WO | 2012148880 A2 | 11/2012 |
| WO | 2012177864 A1 | 12/2012 |
| WO | 2013001266 A1 | 1/2013 |
| WO | 2013009003 A1 | 1/2013 |
| WO | 2013096990 A1 | 7/2013 |
| WO | 2014080144 A1 | 5/2014 |
| WO | 2014104446 A1 | 7/2014 |
| WO | 2014138587 A1 | 9/2014 |
| WO | 2014210584 A1 | 12/2014 |
| WO | 2015061549 A1 | 4/2015 |
| WO | 2015065893 A1 | 5/2015 |
| WO | 2016040612 A1 | 3/2016 |
| WO | 2016123080 A1 | 8/2016 |
| WO | 2016154057 | 9/2016 |
| WO | 2016154057 A1 | 9/2016 |
| WO | 2016200469 A1 | 12/2016 |
| WO | 2017053204 A1 | 3/2017 |
| WO | 2017154533 A1 | 9/2017 |
| WO | 2018008143 A1 | 5/2018 |

OTHER PUBLICATIONS

Kaur, S., et al., "Enhanced thermal transport at covalently functionalized carbon nanotube array interfaces," Nature Communications, Jan. 22, 2014, pp. 1-8.

Maguire, J. A., et al., "Efficient low-temperature thermal functionalization of alkanes. Transfer dehydrogenation catalyzed by Rh(PMe3)2Cl(CO) in solution under a high-pressure hydrogen atmosphere," J. Am. Chem. Soc., Aug. 1, 1991, vol. 113:17, pp. 6706-6708.

Extended European Search Report for EP 16849382.3 dated Apr. 30, 2019, 10 pp.

Extended European Search Report for EP 17865997.5 dated Jul. 22, 2019, 7 pp.

International Search Report and Written Opinion for PCT/US2019/051405 from KIPO dated Jan. 3, 2020, 11 pp.

Rahman, M.A., et al., "The effect of residence time on the physical characterists of PAN-based fibers produced using a solvent-free coagulation process," Materials Science and Engineering A 448, 2007, pp. 275-280.

(56) References Cited

OTHER PUBLICATIONS

Wang, Q., et al., "Nanostructures and Surface Nanomechanical Properties of Polyacrylonitrile/Graphene Oxide Composite Nanofibers by Electrospinning," J. Appl. Polym. Sci., 2013.
Xia, et al., "Effects of resin content and preparing conditions on the properties of polyphenylene sulfide resin/graphite composite for bipolar plate," Journal of Power Sources, vol. 178, Dec. 5, 2007, pp. 363-367.
Kirschner, M., "Ozone," Ullmann's Encyclopedia of Industrial Chemistry, vol. 25, 2012, pp. 637-644.
Minus, M., et al., "The Processing, Properties, and Structure of Carbon Fibers," JOM, Feb. 2005, pp. 52-58.
Pauling, L., General Chemistry, Chapter 15, "Oxidation-Reduction Reactions. Electrolysis," Dover Publications, Inc., 1970, 41 pp.
Polymers: A Properties Database, "Poly(ethylene terphthalate)", Chemnetbase, downloaded from http://poly.chemnetbase.com, Jan. 24, 2016, 5 pp.
Babak, F., et al., "Preparation and Mechanical Properties of Graphene Oxide: Cement Nanocomposites," The Scientific World Journal, vol. 2014, ID 276323, 10 pp.
Extended European Search Report for EP 15834377.2 dated Mar. 9, 2018, 8 pp.
Extended European Search Report for EP 16780450.9 dated Jul. 13, 2018, 18 pp.
Wu, Q., et al., "Suprecapacitors Based on Flexible Graphene/Polyaniline Nanofiber Composite Films," ACS Nano (2010), 4(4):1963-1970.
CN 102586952 Google translation 7 pp.
CN 103545536 Google translation 5 pp.
Chemical Book, <<https://www.chemicalbook.com/ChemicalProductProperty_EN_CB8295389.htm>>, year 2017.
Chemical Book, <<https://www.chemicalbook.com/ProductChemical PropertiesCB8123794_EN.htm>>, year 2017.
Gong, et al., "Optimization of the Reinforcement of Polymer-Based Nanocomposites with Graphene," ECCM15-15th European Conference on Composite Materials, Venice, Italy, Jun. 24-28, 2012.
Gulotty, R., et al., "Effects of Functionalization on Thermal Properties of Single-Wall and Multi-Wall Carbon Nanotube—Polymer Nancomposites," UC Riverside—Polytechnic of Turin (2013), 25 pp.
Porter, Roger S. et al., "Property Opportunities with Polyolefins, A Review Preparations and Applications of High Stiffness and Strength by Uniaxial Draw," Polymer, 35:23, 1994, pp. 4979-4984.
Song, M., et al., "The Effect of Surface Functionalization on the Immobilization of Gold Nanoparticles on Graphene Sheets," Journal of Nanotechnology, vol. 2012, Art. ID 329318, Mar. 28, 2012, 5 pp.
Zheng, H., et al., "Graphene oxide-poly (urea-formaldehyde) composites for corrosion protection of mild steel," Corrosion Science, Apr. 27, 2018, 139, pp. 1-12.
Extended European Search Report for EP 19862892.7 dated Oct. 12, 2021, 11 pp.
Osicka, et al., "Light-Induced and Sensing Capabilities of SI-ATRP Modified Graphene Oxide particles in Elastomeric Matrix," Active and Passive Smart Structures and Integrated Systems 2017, vol. 10164, 1016434, doi: 10.1117/12.2260703, 10.pp.
Wang, Y., et al., "Kevlar oligomer functionalized graphene for polymer composites," Polymer, 52, Juen 15, 2011, 3661-3670.
Extended European Search Report for EP 23154238.2 dated Jun. 13, 2023, 7 pp.
Chen, Y., et al., "Low-temperature and one-pot synthesis of sulfurized graphene nanosheets via in situ doping and their superior electrocatalytic activity for oxygen reduction reaction," J. Mater. Chem. A, 2014, 2, 20714, 2014.
Millipore Sigma, Product data sheet for 1-methyl-2-pyrrolidone dated Feb. 16, 2018 and obtained from https://rsc.aux.eng.ufl.edu/_files/msds/2/1/-Methyl-2-pyrrolidnone.pdf, 2018.
Academic Press Dictionary of Science and Technology ("Flake", p. 1, obtained onkine Aug. 19, 2016).
Ebinezar, et al., "Analysis of hardness test for aluminum carbon nanotube metal matrix and graphene," Indian Journal of Engineering, vol. 10, No. 21, 2014, pp. 33-39.
Extended European Search Report and Opinion for EPO 12844344.7 dated Oct. 22, 2015, 8 pp.
Extended European Search Report and Opinion for EPO 14759787.6 dated Oct. 6, 2016, 13 pp.
Extended European Search Report and Opinion for EPO 14760912.7 dated May 11, 2016, 8 pp.
Fang, Ming et al., "Covalent polymer functionalization of graphene nanosheets and mechanical properties of composites" Journal of Materials Chemistry, 2009, vol. 19, No. 38, pp. 7098-7105.
Herman, Allen et al., "Bipolar plates for PEM fuel cells: a review." International Journal of Hydrogen Energy, 2005, vol. 30, No. 12, pp. 1297-1302.
Hwang, T., et al., "One-step metal electroplating and patterning on a plastic substrate using an electrically-conductive layer of few-layer graphene," Carbon, Sep. 17, 2011, vol. 50, No. 2, pp. 612-621.
International Search Report and Written Opinion for PCT/US2012/061457 from KIPO dated Mar. 15, 2013, 10 pp.
International Search Report and Written Opinion for PCT/US2014/021765 from KIPO dated Jul. 24, 2014, 11 pp.
International Search Report and Written Opinion for PCT/US2014/021810 from KIPO dated Jul. 14, 2014, 10 pp.
International Search Report and Written Opinion for PCT/US2014/062371 from KIPO dated Feb. 11, 2015, 12 pp.
International Search Report and Written Opinion for PCT/US2015/045657 from KIPO dated Oct. 27, 2015, 6 pp.
International Search Report and Written Opinion for PCT/US2015/049398 from KIPO dated Dec. 16, 2015, 13 pp.
International Search Report and Written Opinion for PCT/US2016/014873 from KIPO dated May 13, 2016, 15 pp.
International Search Report and Written Opinion for PCT/US2016/022229 from KIPO dated Jun. 27, 2016, 15 pp.
International Search Report and Written Opinion for PCT/US2016/023273 from KIPO dated Jul. 12, 2016.
International Search Report and Written Opinion for PCT/US2016/023435 from KIPO dated May 30, 2016, 13 pp.
International Search Report and Written Opinion for PCT/US2016/025307 from KIPO dated Sep. 12, 2016, 11 pp.
International Search Report and Written Opinion for PCT/US2016/025338 from KIPO dated Jul. 25, 2016, 12 pp.
International Search Report and Written Opinion for PCT/US2016/052292 from KIPO dated Nov. 21, 2016, 14 pp.
International Search Report and Written Opinion for PCT/US2017/027231 from KIPO dated Jul. 11, 2017, 18 pp.
Jeon, In-Yup et al., "Edge-carboxylated graphene nanosheets via ball milling." Proceedings of the National Academy of Sciences of the United States of America PNAS, Apr. 10, 2012, vol. 109, No. 15, pp. 5588-5593.
Liu, Y. B., et al., "Recent development in the fabrication of metal matrix-particulate composites using powder metallurgy techniques," Journal of Materials Science, vol. 29, No. 8, 1994, pp. 1999-2007.
McQuarrie (2011, General Chemistry (4th Edition). University Science Books, Appendix G Standard Reduction Voltages for Aqueous Solutions at 25C, p. A-34 to A-37 and also p. 949, Table 25.3. Online version available at: http://app.knovel.com/hotlink!toc/id:kpGCE00013/general-chemistry-4th/general-chemistry-4th).
Merriam-Webster ("Definition of Flake" p. 1-9, obtained online Aug. 19, 2016).
Mohajerani, E., et al., "Morphological and thickness analysis for PMMA spin coated films," Journal of Optoelectronics and Advanced Materials, vol. 9:12, Dec. 2007, p. 3901-3906.
Moustafa, S.F., et al., "Copper matrix SiC and A1203 particulate composites by powder metallurgy technique," Materials Letters, 2002, vol. 53, No. 4, pp. 244-249.
Ong, T. S., et al., "Effect of atmosphere on the mechanical milling of natural graphite," Carbon, 2000, vol. 38, No. 15, pp. 2077-2285.
Persulfates Technical Information, FMC, (http://ww.peroxychem.com/media/90826/aod_brochure_persulfate.pdf, downloaded on Jan. 19, 2017) 16 pp.

(56) References Cited

OTHER PUBLICATIONS

Rafiee, Mohammad A. et al., "Fracture and fatigue in graphene nanocomposites." Small, 2010, vol. 6, No. 2, pp. 179-183.
Steurer, Peter et al., "Functionalized graphenes and thermoplastic nanocomposites based upon expanded graphite oxide." Macromolecular Rapid Communications, 2009, vol. 30, Nos. 4-5, pp. 316-327.
Taeseon, Hwang, et al.,"One-step metal electroplating and patterning on a plastic substrate using an electrically conductive layer of few-layer graphene," Carbon, Elsevier, Oxford, GB, vol. 50, No. 2, Sep. 8, 2011, pp. 612-621.
USP Technologies, "What is the pH of H2O2 solutions?," http://www.h2o2.com/faqs/FaqDetail.aspx?fId=26, accessed Jan. 19, 2017, 2 pp.
Wang, Xin et al., "In situ polymerization of graphene nanosheets and polyurethane with enhanced mechanical and thermal properties." Journal of materials Chemistry, 2011, vol. 21, No. 12, pp. 4222-4227.
Wang, Y., et al., "Electrochemical Delamination of CVD-Grown Graphene Film: Toward the Recyclable Use of Copper Catalyst," ACS Nano, vol. 5, No. 12, Oct. 30, 2011, pp. 9927-9933.
Wu, Z-S. et al., "Field Emission of Single-Layer Films Prepared by Electrophoretic Deposition." Advanced Materials, 21, 2009, pp. 1756-1760.
Zhao, W., et al., "Preparation of graphene by exfoliation of graphite using wet ball milling." Journal of Materials Chemistry, Jun. 3, 2010, vol. 20, pp. 5817-5819.
Bourlinos, A.B., et al., "Graphite Oxide: Chemical Reduction to Graphite and Surface Modification with Primary Aliphatic Amines and Amino Acids," Langmuir 2003, vol. 19, pp. 6050-6055.
Feng, H., et al., "A low-temperature method to produce highly reduced graphene oxide," Nature Communications, Feb. 26, 2013, 8 pp.
Szabo, T., et al., "Evolution of Surface Functional Groups in a Series of Progressively Oxidized Graphite Oxides," Chem. Mater., vol. 18, Mar. 29, 2006, pp. 2740-2749.
Extended European Search Report for EP 16765526.5 dated Feb. 13, 2018, 7 pp.
Extended European Search Report for EP 16769452.0 dated Mar. 1, 2018, 9 pp.
Extended European Search Report for EP 16780450.9 dated Apr. 19, 2018, 17 pp.
Jeon, I-Y., et al., "Large Scale Production of Edge-Selectively Functionalized Graphene Nanoplatelets via Ball Milling and Their Use as Metal-Free Electrocatalysts for Oxygen Reduction Reaction," J Am Chem Soc (2013), 135-1386-1393.
Li, Y., et al., "Hybridizing wood cellulose and graphene oxide toward high-performance fibers," NPG Asia Materials, 7, Jan. 9, 2015, 14 pp.
Oh, Won-Chun, et al., "The Effect of Thermal and Ultrasonic Treatment on the Formation of Graphene-oxide Nanosheets," Journal of the Korean Physical Society, vol. 56, No. 4, Apr. 2010, pp. 1097-1102.
Tissera, N., et al., "Hydrophobic cotton textile surfaces using an amphiphilic graphene oxide (GO) coating," Applied Surface Science, 324, Nov. 4, 2014 (2015), pp. 455-463.
Yuanyuan, L., et al. "Hybridizing Wood Cellulose and Graphene Oxide toward High-Performance Fibers," NPG Asia Materials (2015) 7(e150), 14 pp.
Extended European Search Report and Opinion for EPO 17185605.7 dated Nov. 29, 2017, 7 pp.
International Search Report and Written Opinion for PCT/US2017/058512 from KIPO dated Feb. 7, 2018, 14 pp.

\* cited by examiner

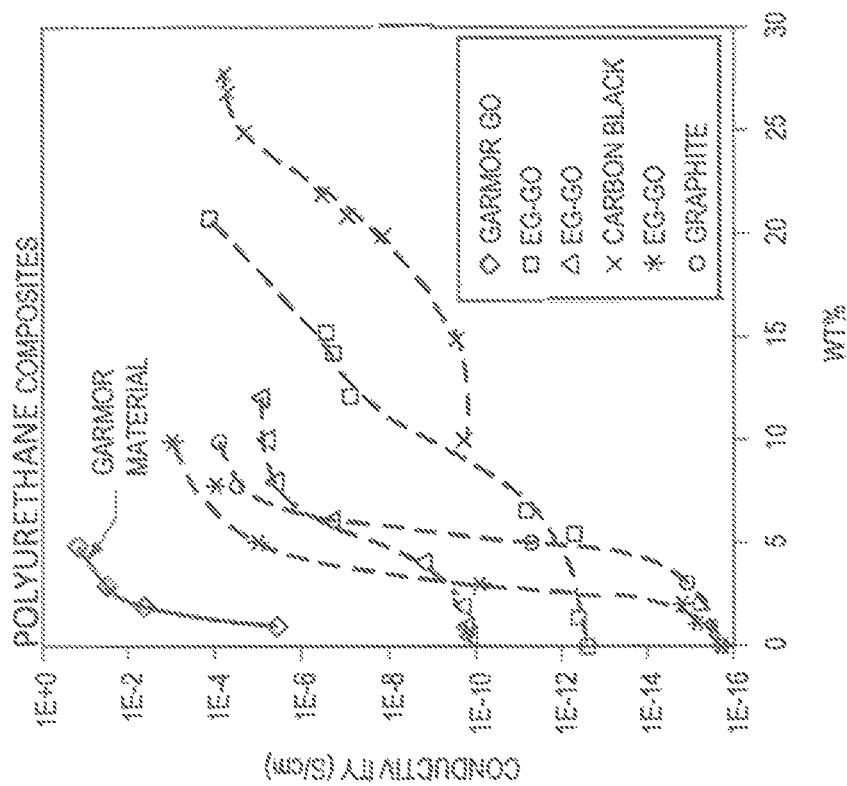
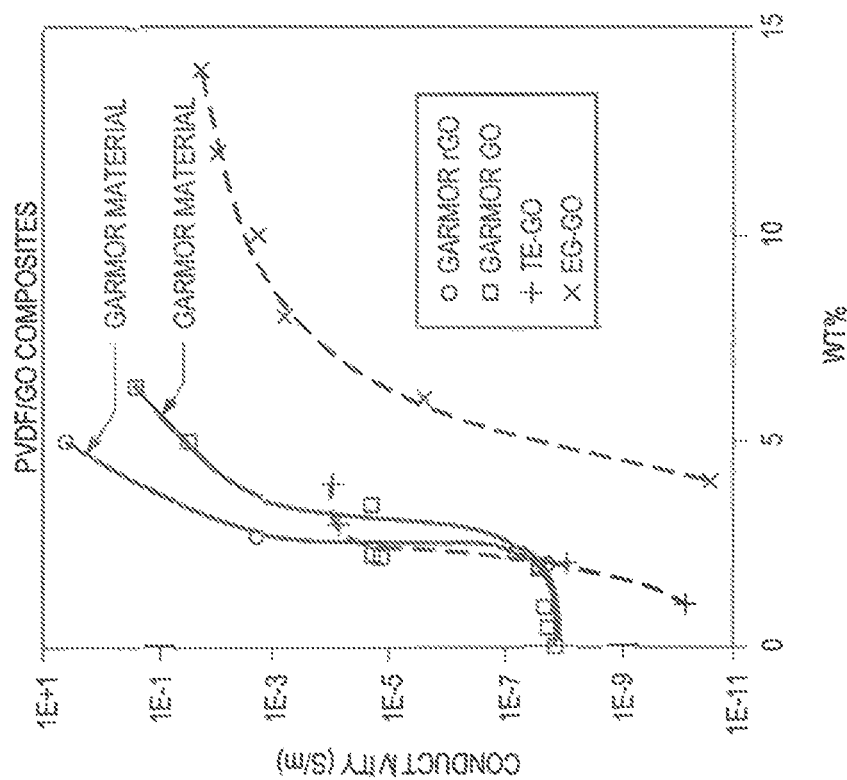

UNIFORM DISPERSING OF GRAPHENE NANOPARTICLES IN A HOST

CROSS-REFERENCE TO RELATED APPLICATIONS

This application is the National Stage of International Application No. PCT/US2016/022229, filed on Mar. 12, 2016 claiming the priority to U.S. Provisional Application No. 62/132,699 filed on Mar. 13, 2015, the contents of each of which are incorporated by reference herein.

TECHNICAL FIELD OF THE INVENTION

The present invention relates in general to the field of graphite, and more particularly, to compositions and methods of graphite oxide entrainment in cement and asphalt composites.

BACKGROUND OF THE INVENTION

Without limiting the scope of the invention, its background is described in connection with composite materials.

Graphene is an allotrope of carbon. Graphene's purest form is a one-atom-thick planar sheet of $sp^2$-bonded carbon atoms that are densely packed in a honeycomb or hexagonal crystal lattice. In the last few years scientists have identified multi-layer graphene oxide or a few layer of graphite oxide to be of sufficient strength and electrical conductivity to be useful as an additive in a host to provide superior mechanical, chemical, thermal, gas barrier, electrical, flame retardant and other properties compared to the native host. Improvement in the physicochemical properties of the host depends on: 1) a uniform distribution and entrainment of the graphene flake, 2) optimizing the interfacial bonding between the graphene flake and host's matrix, 3) removal of gasses entrained in the host during processing, 4) optimizing the additive's innate properties, e.g. flatness, and 5) optimizing the thickness to surface-area ratio of the graphene flake and/or the chemical functionalization or decoration on the flake/particle.

Graphene is one of the strongest materials ever tested. Various research institutes have loaded hosts with carbon allotropes such as carbon nanotubes (CNT), graphene flakes (GF), graphene oxide (GO), and graphite oxide and have seen up to a 200% increase in tensile strength in the loaded host, but with inconsistent results. Measurements have shown that graphene has a breaking strength 200 times greater than steel, with a tensile modulus (stiffness) of 1 TPa (150,000,000 psi). An atomic Force Microscope (AFM) has been used to measure the mechanical properties of a suspended graphene sheet.

Graphene sheets held together by van der Waals forces were suspended over $SiO_2$ cavities where an AFM tip was probed to test its mechanical properties. Its spring constant was in the range 1-5 N/m and the Young's modulus was 0.5 TPa (500 GPa) thereby demonstrating that graphene can be mechanically very strong and rigid.

Depending on whether they are single walled CNTs (SWCNTs) or multi-walled CNTs (MWCNTs), generally, SWCNTs have the diameter of 1-3 nm and MWCNTs have the diameters 5-50 nm. The length of CNTs can be up to centimeters, which gives an aspect ratio exceeding 1000. CNTs also exhibit extraordinary strength with moduli of elasticity on the order of TPa and tensile strength in the range of GPa. With the concurrent benefits of high aspect ratio to surface area, CNTs and MWCNTs have been found to improve the electrical, mechanical and thermal properties of the host material. However, incorporation of CNTs in composites has proven to be complex, yielding inconsistent results. Researchers have found that the addition of CNTs results in little change in strength or even deterioration of the composite. Owing to strong attractive forces between particles, CNTs tend to form agglomerates, self-attraction or self-assembly similar to that seen in carbon black creating defect sites in the composites. Non-uniform distribution/dispersion of CNT bundles is responsible for the deterioration of the host's properties.

Graphitic nanomaterials such as graphene, graphene oxide, and carbon nanotubes are currently being investigated as multifunctional polymer fillers. Because of the incredible strength, chemical stability, electrical and thermal conductivity of these materials, their incorporation into a polymer matrix increases material strength and makes otherwise electrically and thermally insulating polymers have more metal-like properties. The greatest difficulty in efficient and effective dispersion of graphene stems from its attraction to itself, leading researchers to go to great lengths to find compatible polymers. This is typically done through chemical functionalization of the graphitic surface, sacrificing the graphene's properties for compatibility.

Most recent methods of dispersing graphene and graphite oxide into host such as a polymers, metal, or ceramic center around solvent-assisted methods or melt-compounding. In a solvent-assisted dispersion of graphene, the graphene is first dispersed into a solvent, which is soluble or dissolves the target host. The solvent, that is often flammable, must then be removed. Eliminating the solvent from the process makes the process less expensive and safer.

Melt-compounding raw compound materials are typically in the form of small beads or powder and are fed from a hopper into the barrel of an extruder or hot press. In the case of an extruder, additives and fillers, such as graphene, are in the form of mixed powders prior to placing the material in the hopper. The combined material enters near the rear of the barrel and comes into contact with the screw that moves the combined material forward through the barrel. The combined material is then moved through heated sections of the barrel, which allows the combined materials to melt gradually as they are pushed through the barrel. Additional heat is generated from the intense pressure and friction inside the barrel. However, the melt-compounding process often leads to a non-uniform dispersion particularly when the additive is less than a few percent. In the case of a hot press, the powder is placed into a vessel that exposes the host material to both high temperature and pressure simultaneously. To date, the difficulty in the traditional dispersion techniques has limited the use of graphene and graphite oxide in polymers, composites and in general are limited to laboratory-scale projection.

SUMMARY OF THE INVENTION

This invention deals with a simple, scalable method of dispersing graphene into a host. In one embodiment, the present invention includes a method of large-scale production of graphene composites with mechanical-thermal-compounding. Graphene loaded into a host can improve the mechanical properties, and is thermally conductive and electrically conductive. This invention utilizes a jar mixing method to disperse the graphene/graphite oxide powder into a host powder to form a composite powder. The composite powder is then placed into a cold press to induce mechanical exfoliation of graphene/graphite oxide flakes and mechanochemical interaction between elements of the composite powder forming a loosely bound structure. Mechanical-thermal-compounding uses a cold press to apply pressure to form a loosely bound solid structure from the mixed powders. The compaction process induces mechanical exfoliation of graphene/graphite oxide flakes and mechanochemical interaction between elements of the powder and results in a loosely bound solid structure. This is similar to compression molding. Cold compression molding or cold molding is used in the plastic, pharmaceutical and ceramics industry industries to form tablets or preformed "biscuits" to form near net shape structures prior to sintering extrusion of melt casting. The compression molded composite powder is mechanically processed back to a powder. Subsequent cold compression molding of the composite powder improves the exfoliation of graphene/graphite oxide and mechanochemical interaction between elements in the composite powders. After the last cold compression molding and mechanical processing to a powder, the powder can be used as the source material for a composite structure. The thermal treatment can be performed by traditional processes including but not limited to compression molding with heating, hot pressing, extrusion or injection molding that results in a composite with the desired physical characteristics. The resulting composite can be molded into useful shapes and sizes while keeping the advantages imparted by graphene and graphite oxide.

In one embodiment, the present invention includes a method of making a composite of graphene/graphite oxide powder and a host powder by a solventless process comprising: cold compressing a mixture of the graphene/graphite oxide powder and the host powder to form a biscuit; crushing, powderizing, or grounding the biscuit into a powderized biscuit; and combining the powderized biscuit with an extrudable material to form a composite. In one aspect, the method further comprises a second compression molding and a second powderizing steps. In another aspect, the method further comprises the step of dispersing the graphene/graphite oxide powder into a host powder to form a composite powder prior to cold compressing the mixture. In another aspect, the method further comprises the step of dispersing the graphene/graphite oxide powder into a host powder to form a composite powder in the presence of ball bearings to break up clumps or agglomerations. In another aspect, the method further comprises a first and a second cold compression molding step, wherein the first cold compression uses a pressure of at least 1 kPa, and the second cold compression molding is at a pressure equal to or greater than 10 kPa. In another aspect, the second cold compression forms a second biscuit that is also crushed, powdered, or grounded into a second powderized biscuit prior to mixing with the extrusion material to form the composite. In another aspect, the host powder is selected from ordinary Portland cement, polypropylene (PP), polyethylene (PE), Polycarbonate (PC), ceramic powders, ceramic powder is aluminum oxide, zirconium oxide, silica, silicon dioxide, or combination thereof, metal powders, metal powders of titanium, titanium hydride, tantalum, cobalt chrome, niobium, stainless steel, nickel, copper, aluminum, or combinations thereof, a polycrystalline material, polyvinylidene fluoride (PVF), or polyvinylidene difluoride (PVDF), polyurethane, poly(butyleneterephthalate), nylon 11, poly(ethyleneterephthalate), poly(ether ether ketone), poly(phenylene sulfide), polyolefin, an oxide, carbonate or silicate of an element of Groups 2a, 3a, 4a and 4b of the Periodic Table, poly(vinyl chloride) (PVC), poly(methylmethacrylate), polystyrene, polycarbonate/nylon alloy, polycarbonate/polyester alloy, ABS, ABS/nylon alloy, ABS/PVC alloy, acrylic copolymers, polysulfone, polysulfone/ABS alloy, polyetherimides, polyamide-imides, polyarylates, fluoropolymers, polyphenylene oxide/polystyrene blend, or poly(phenylene sulfide). In another aspect, the method further comprises the step of compression molding with heating, hot pressing, extrusion or injection molding the powderized biscuit with an extrudable material to form the composite. In another aspect, the graphene/graphite oxide flake is exfoliated to be less 10 nm during the cold compression molding process without changing the surface area of the graphene/graphite oxide flake.

Yet another embodiment of the present invention includes a method of making a graphene/graphite oxide composite from a cold compression molded powder comprising the steps of: cold compressing a mixture of the graphene/graphite oxide powder and the host powder to form a biscuit; crushing, powderizing, or grounding the biscuit into a powderized biscuit; and compression molding with heating, hot pressing, extrusion or injection molding the powderized biscuit with an extrudable material to form the composite. In one aspect, the method further comprises a second compression molding and a second powderizing steps. In another aspect, the method further comprises the step of dispersing the graphene/graphite oxide powder into a host powder to form a composite powder prior to cold compressing the mixture. In another aspect, the method further comprises the step of dispersing the graphene/graphite oxide powder into a host powder to form a composite powder in the presence of ball bearings to break up clumps or agglomerations. In another aspect, the method further comprises a first and a second cold compression molding step, wherein the first cold compression uses a pressure of at least 1 kPa, and the second cold compression molding is at a pressure equal to or greater than 10 kPa. In another aspect, the step second cold compression forms a second biscuit that is also crushed, powdered, or grounded into a second powderized biscuit prior to mixing with the extrusion material to form the composite. In another aspect, the host powder is selected from ordinary Portland cement, polypropylene (PP), polyethylene (PE), Polycarbonate (PC), ceramic powders, ceramic powder is aluminum oxide, zirconium oxide, silica, silicon dioxide, or combination thereof, metal powders, metal powders of titanium, titanium hydride, tantalum, cobalt chrome, niobium, stainless steel, nickel, copper, aluminum, or combinations thereof, a polycrystalline material, polyvinylidene fluoride (PVF), or polyvinylidene difluoride (PVDF), polyurethane, poly(butyleneterephthalate), nylon 11, poly(ethyleneterephthalate), poly(ether ether ketone), poly(phenylene sulfide), polyolefin, an oxide, carbonate or silicate of an element of Groups 2a, 3a, 4a and 4b of the Periodic Table, poly(vinyl chloride) (PVC), poly(methylmethacrylate), polystyrene, polycarbonate/nylon alloy, polycarbonate/polyester alloy, ABS, ABS/nylon alloy, ABS/PVC alloy, acrylic copolymers, polysulfone, polysulfone/ABS alloy, polyetherimides, polyamide-imides, polyarylates, fluoropolymers, polyphenylene oxide/polystyrene blend, or poly(phenylene sulfide). In another aspect, the graphene/graphite oxide flake is exfoliated to be less 10 nm during the cold compression molding process without changing the surface area of the graphene/graphite oxide flake.

Another embodiment of the present invention includes a method of making a composite powder of a graphene/graphite oxide powder in a host powder by a solventless process comprising: dispersing the graphene/graphite oxide powder into a host powder to form a composite powder; a first cold compression molding of the composite powder to form a biscuit; crushing, powderizing, or grounding the biscuit into a powderized biscuit; and extruding the powderized biscuit into an extrudable material to form a composite, wherein the method improves the dispersion and exfoliation of the graphene/graphite oxide flakes in the composite. In one aspect, the host powder is selected from ordinary Portland cement, polypropylene (PP), polyethylene (PE), Polycarbonate (PC), ceramic powders, ceramic powder is aluminum oxide, zirconium oxide, silica, silicon dioxide, or combination thereof, metal powders, metal powders of titanium, titanium hydride, tantalum, cobalt chrome, niobium, stainless steel, nickel, copper, aluminum, or combinations thereof, a polycrystalline material, polyvinylidene fluoride (PVF), or polyvinylidene difluoride (PVDF), polyurethane, poly(butyleneterephthalate), nylon 11, poly(ethyleneterephthalate), poly(ether ether ketone), poly(phenylene sulfide), polyolefin, an oxide, carbonate or silicate of an element of Groups 2a, 3a, 4a and 4b of the Periodic Table, poly(vinyl chloride) (PVC), poly(methylmethacrylate), polystyrene, polycarbonate/nylon alloy, polycarbonate/polyester alloy, ABS, ABS/nylon alloy, ABS/PVC alloy, acrylic copolymers, polysulfone, polysulfone/ABS alloy, polyetherimides, polyamide-imides, polyarylates, fluoropolymers, polyphenylene oxide/polystyrene blend, or poly(phenylene sulfide). In another aspect, the graphene/graphite oxide flake is exfoliated to be less 10 nm during the cold compression molding process without changing the surface area of the graphene/graphite oxide flake.

BRIEF DESCRIPTION OF THE DRAWINGS

For a more complete understanding of the features and advantages of the present invention, reference is now made to the detailed description of the invention along with the accompanying figures and in which:

FIG. 1 shows the electrical performance of the invention in two different plastics, polyvinylidene difluoride (PVDF) and polyurethane.

DESCRIPTION OF THE PREFERRED EMBODIMENTS

While the making and using of various embodiments of the present invention are discussed in detail below, it should be appreciated that the present invention provides many applicable inventive concepts that can be embodied in a wide variety of specific contexts. The specific embodiments discussed herein are merely illustrative of specific ways to make and use the invention and do not delimit the scope of the invention.

To facilitate the understanding of this invention, a number of terms are defined below. Terms defined herein have meanings as commonly understood by a person of ordinary skill in the areas relevant to the present invention. Terms such as "a", "an" and "the" are not intended to refer to only a singular entity, but include the general class of which a specific example may be used for illustration. The terminology herein is used to describe specific embodiments of the invention, but their usage does not delimit the invention, except as outlined in the claims.

The present invention uses a mixing step (e.g., mixing in a jar or jar mixing) to disperse the graphene/graphene oxide powder into a host powder to form a composite powder. The composite powder is then placed into a press for cold compression molding forming a biscuit with enhanced exfoliation of graphene/graphene oxide flakes and mechanochemical induced interaction between graphene/graphene oxide and host powder. The cold compression molding requires a pressure of at least 1 kPa to achieve exfoliation of graphene/graphene oxide flakes and mechanochemical interaction. The resulting biscuit is then crushed or ground into a more homogeneous composite powder relative to the starting powder mixture. The powderized biscuit is then placed into the cold press for a second cold compression molding at a pressure of greater than 1 kPa, preferably 10 kPa, to induce additional mechanical exfoliation of graphene/graphene oxide flakes and mechanochemical interaction forming a second biscuit structure. The cold compression molding and biscuit powderized is repeated several times. Each cold compression molding and biscuit powderized iteration improves dispersion and exfoliation of the graphene/graphene oxide flakes in the host powder. After the last cold compression molding and mechanical processing to a powder the powder can be used as the source material to for a composite structure. The composite structure has enhanced physical properties. As can be seen in FIG. 1, a dramatic enhancement in conductivity was obtained as a function of this invention relative to other materials and dispersion techniques. The enhanced conductivity is well over 100 times that of other materials and dispersion techniques in polyvinylidene difluoride (PVDF) and polyurethane. The thermal treatment can be performed by traditional processes including but not limited to compression molding with heating, hot pressing, extrusion or injection molding resulting in a composite with the desired physical characteristics. The resulting composite is of useful shapes and sizes while keeping the advantages imparted by graphene and graphene oxide.

In one non-limiting example, the host powder is selected from ordinary Portland cement, polypropylene (PP), polyethylene (PE), Polycarbonate (PC), ceramic powders, ceramic powder is aluminum oxide, zirconium oxide, silica, silicon dioxide, or combination thereof, metal powders, metal powders of titanium, titanium hydride, tantalum, cobalt chrome, niobium, stainless steel, nickel, copper, aluminum, or combinations thereof, a polycrystalline material, polyvinylidene fluoride (PVF), or polyvinylidene difluoride (PVDF), polyurethane, poly(butyleneterephthalate), nylon 11, poly(ethyleneterephthalate), poly(ether ether ketone), poly(phenylene sulfide), polyolefin, an oxide, carbonate or silicate of an element of Groups 2a, 3a, 4a and 4b of the Periodic Table, poly(vinyl chloride) (PVC), poly(methylmethacrylate), polystyrene, polycarbonate/nylon alloy, polycarbonate/polyester alloy, ABS, ABS/nylon alloy, ABS/PVC alloy, acrylic copolymers, polysulfone, polysulfone/ABS alloy, polyetherimides, polyamide-imides, polyarylates, fluoropolymers, polyphenylene oxide/polystyrene blend, or poly(phenylene sulfide). The skilled artisan will recognize that these and other materials can be used in a cold compression step to capture the graphene/graphite oxide flakes and form a powder or biscuit into which the graphene/graphite oxide flakes are dispersed and from which the charge problems associated with the prior art are eliminated.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

It is contemplated that any embodiment discussed in this specification can be implemented with respect to any method, kit, reagent, or composition of the invention, and vice versa. Furthermore, compositions of the invention can be used to achieve methods of the invention.

It will be understood that particular embodiments described herein are shown by way of illustration and not as limitations of the invention. The principal features of this invention can be employed in various embodiments without departing from the scope of the invention. Those skilled in the art will recognize, or be able to ascertain using no more than routine experimentation, numerous equivalents to the specific procedures described herein. Such equivalents are considered to be within the scope of this invention and are covered by the claims.

All publications and patent applications mentioned in the specification are indicative of the level of skill of those skilled in the art to which this invention pertains. All publications and patent applications are herein incorporated by reference to the same extent as if each individual publication or patent application was specifically and individually indicated to be incorporated by reference.

The use of the word "a" or "an" when used in conjunction with the term "comprising" in the claims and/or the specification may mean "one," but it is also consistent with the meaning of "one or more," "at least one," and "one or more than one." The use of the term "or" in the claims is used to mean "and/or" unless explicitly indicated to refer to alternatives only or the alternatives are mutually exclusive, although the disclosure supports a definition that refers to only alternatives and "and/or." Throughout this application, the term "about" is used to indicate that a value includes the inherent variation of error for the device, the method being employed to determine the value, or the variation that exists among the study subjects.

As used in this specification and claim(s), the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps. In embodiments of any of the compositions and methods provided herein, "comprising" may be replaced with "consisting essentially of" or "consisting of". As used herein, the phrase "consisting essentially of" requires the specified integer(s) or steps as well as those that do not materially affect the character or function of the claimed invention. As used herein, the term "consisting" is used to indicate the presence of the recited integer (e.g., a feature, an element, a characteristic, a property, a method/process step or a limitation) or group of integers (e.g., feature(s), element(s), characteristic(s), propertie(s), method/process steps or limitation(s)) only.

The term "or combinations thereof" as used herein refers to all permutations and combinations of the listed items preceding the term. For example, "A, B, C, or combinations thereof" is intended to include at least one of: A, B, C, AB, AC, BC, or ABC, and if order is important in a particular context, also BA, CA, CB, CBA, BCA, ACB, BAC, or CAB. Continuing with this example, expressly included are combinations that contain repeats of one or more item or term, such as BB, AAA, AB, BBC, AAABCCCC, CBBAAA, CABABB, and so forth. The skilled artisan will understand that typically there is no limit on the number of items or terms in any combination, unless otherwise apparent from the context.

As used herein, words of approximation such as, without limitation, "about", "substantial" or "substantially" refers to a condition that when so modified is understood to not necessarily be absolute or perfect but would be considered close enough to those of ordinary skill in the art to warrant designating the condition as being present. The extent to which the description may vary will depend on how great a change can be instituted and still have one of ordinary skilled in the art recognize the modified feature as still having the required characteristics and capabilities of the unmodified feature. In general, but subject to the preceding discussion, a numerical value herein that is modified by a word of approximation such as "about" may vary from the stated value by at least ±1, 2, 3, 4, 5, 6, 7, 10, 12 or 15%.

Additionally, the section headings herein are provided for consistency with the suggestions under 37 CFR 1.77 or otherwise to provide organizational cues. These headings shall not limit or characterize the invention(s) set out in any claims that may issue from this disclosure. Specifically and by way of example, although the headings refer to a "Field of Invention," such claims should not be limited by the language under this heading to describe the so-called technical field. Further, a description of technology in the "Background of the Invention" section is not to be construed as an admission that technology is prior art to any invention(s) in this disclosure. Neither is the "Summary" to be considered a characterization of the invention(s) set forth in issued claims. Furthermore, any reference in this disclosure to "invention" in the singular should not be used to argue that there is only a single point of novelty in this disclosure. Multiple inventions may be set forth according to the limitations of the multiple claims issuing from this disclosure, and such claims accordingly define the invention(s), and their equivalents, that are protected thereby. In all instances, the scope of such claims shall be considered on their own merits in light of this disclosure, but should not be constrained by the headings set forth herein.

All of the compositions and/or methods disclosed and claimed herein can be made and executed without undue experimentation in light of the present disclosure. While the compositions and methods of this invention have been described in terms of preferred embodiments, it will be apparent to those of skill in the art that variations may be applied to the compositions and/or methods and in the steps or in the sequence of steps of the method described herein without departing from the concept, spirit and scope of the invention. All such similar substitutes and modifications apparent to those skilled in the art are deemed to be within the spirit, scope and concept of the invention as defined by the appended claims.

What is claimed is:

1. A method of making a composite of graphene oxide powder or graphite oxide powder and a host powder by a solventless process consisting of:
dispersing the graphene oxide powder or graphite oxide powder into the host powder, wherein the graphene oxide powder comprises graphene oxide flakes or the graphite oxide powder comprises graphite oxide flakes, and wherein the host powder consists of polyurethane;

cold compressing a mixture formed by dispersing the graphene oxide powder or graphite oxide powder into the host powder to form a first biscuit, wherein the step of cold compressing the mixture uses a pressure of 1 kPa, and wherein the graphene oxide powder or graphite oxide powder is exfoliated by the cold compressing to reduce a thickness of each graphene oxide flake or a thickness of each graphite oxide flake to less than 10 nm during the step of cold compressing the mixture without changing the surface area of each graphene oxide flake or graphite oxide flake;

crushing, powderizing, or grinding the first biscuit into a first powderized biscuit;

cold compressing the first powderized biscuit into a second biscuit, wherein the step of cold compressing the first powderized biscuit uses a pressure of 10 kPa;

crushing, powderizing or grinding the second biscuit into a second powderized biscuit;

combining the second powderized biscuit with an additional extrudable material;

compression molding with heating or injection molding the second powderized biscuit with the additional extrudable material to form the composite; and shaping the composite into a specific shape.

2. The method of claim 1, wherein the step of dispersing the graphene oxide powder or graphite oxide powder into the host powder to form the composite powder is performed in the presence of ball bearings to break up clumps or agglomerations.

3. The method of claim 1, wherein the host powder consists of polyurethane and the composite is of about 1 to 5 weight % graphite oxide or graphene oxide.

4. A method of making a graphene oxide or graphite oxide composite from a cold compression molded powder consisting of:

dispersing a graphene oxide powder or a graphite oxide powder into a host powder to form a composite powder, wherein the graphene oxide powder comprises graphene oxide flakes or the graphite oxide powder comprises graphite oxide flakes, and wherein the host powder consists of polyurethane;

cold compressing the composite powder formed by dispersing the graphene oxide powder or graphite oxide powder into the host powder to form a first biscuit at a pressure of 1 kPa, wherein the graphene oxide powder or graphite oxide powder is exfoliated by the cold compressing to reduce a thickness of each graphene oxide flake or a thickness of each graphite oxide flake to less than 10 nm during the step of cold compressing the composite powder without changing the surface area of each graphene oxide flake or graphite oxide flake;

crushing, powderizing, or grinding the first biscuit into a first powderized biscuit;

cold compressing the first powderized biscuit into a second biscuit at a pressure of 10 kPa;

crushing, powderizing or grinding the second biscuit into a second powderized biscuit; and compression molding with heating or injection molding the second powderized biscuit with an additional extrudable material to form the composite; and shaping the composite into a specific shape.

5. The method of claim 4, wherein the step of dispersing the graphene oxide powder or graphite oxide powder into the host powder to form the composite powder is performed in the presence of ball bearings to break up clumps or agglomerations.

6. A method of making a composite powder of a graphene oxide powder or graphite oxide powder in a host powder by a solventless process consisting of:

dispersing the graphene oxide powder or graphite oxide powder, wherein the graphene oxide powder comprises graphene oxide flakes or the graphite oxide powder comprises graphite oxide flakes, and wherein the host powder consists of polyurethane, into the host powder to form a composite powder;

a first cold compression molding of the composite powder formed by the dispersing of the graphene oxide powder or graphite oxide powder into the host powder to form a first biscuit, wherein the first cold compression uses a pressure of 1 kPa, and wherein the graphene oxide powder or graphite oxide powder is exfoliated by the cold compressing to reduce a thickness of each graphene oxide flake or a thickness of each graphite oxide flake to less than 10 nm during the first cold compression molding without changing the surface area of each graphene oxide flake or graphite oxide flake;

crushing, powderizing, or grinding the first biscuit into a first powderized biscuit;

a second cold compression molding of the first powderized biscuit into a second biscuit, wherein the second cold compression is at a pressure of 10 kPa;

crushing, powderizing or grinding the second biscuit into a second powderized biscuit;

combining the second powderized biscuit with an extrudable material to form the composite powder;

wherein the method improves the dispersion and exfoliation of the graphene oxide powder or graphite oxide powder in the composite powder.

\* \* \* \* \*